(12) United States Patent
Liu et al.

(10) Patent No.: US 9,490,458 B2
(45) Date of Patent: Nov. 8, 2016

(54) ELECTRIC VEHICLE BATTERY WITH TEMPERATURE CONTROL

(75) Inventors: Jianguo Liu, Guangdong (CN); Zhiwei Tong, Guangdong (CN)

(73) Assignee: BYD Company Limited, Shenzhen, Guangdong (CN)

( * ) Notice: Subject to any disclaimer, the term of this patent is extended or adjusted under 35 U.S.C. 154(b) by 1056 days.

(21) Appl. No.: 13/340,244

(22) Filed: Dec. 29, 2011

(65) Prior Publication Data

US 2012/0171528 A1 Jul. 5, 2012

(30) Foreign Application Priority Data

Dec. 31, 2010 (CN) .......................... 2010 1 0622284
Apr. 22, 2011 (CN) .......................... 2010 1 0621585

(51) Int. Cl.

| | |
|---|---|
| *H01M 10/50* | (2006.01) |
| *H01M 2/04* | (2006.01) |
| *H01M 2/26* | (2006.01) |
| *H01M 10/48* | (2006.01) |
| *H01M 10/625* | (2014.01) |
| *H01M 10/6553* | (2014.01) |
| *H01M 10/615* | (2014.01) |
| *H01M 10/653* | (2014.01) |
| *H01M 10/647* | (2014.01) |
| *H01M 10/654* | (2014.01) |
| *H01M 10/6556* | (2014.01) |

(Continued)

(52) U.S. Cl.
CPC ........... *H01M 2/0473* (2013.01); *H01M 2/043* (2013.01); *H01M 2/263* (2013.01); *H01M 10/486* (2013.01); *H01M 10/613* (2015.04); *H01M 10/615* (2015.04); *H01M 10/625* (2015.04); *H01M 10/647* (2015.04); *H01M 10/653* (2015.04); *H01M 10/654* (2015.04); *H01M 10/6551* (2015.04); *H01M 10/6553* (2015.04); *H01M 10/6554* (2015.04); *H01M 10/6556* (2015.04); *H01M 10/6561* (2015.04); *H01M 10/6567* (2015.04)

(58) Field of Classification Search
CPC .. H01M 2/043; H01M 2/263; H01M 10/486; H01M 10/5004; H01M 10/5006; H01M 10/5016; H01M 10/5032; H01M 10/504; H01M 10/5042; H01M 10/5046; H01M 10/5051; H01M 10/5053; H01M 10/5057; H01M 2/0473; H01M 10/5075; H01M 10/5063
USPC ............................................ 429/62, 120, 94
See application file for complete search history.

(56) References Cited

U.S. PATENT DOCUMENTS

| | | |
|---|---|---|
| 4,292,381 A | 9/1981 | Klein |
| 5,332,633 A | 7/1994 | Adamson et al. |

(Continued)

FOREIGN PATENT DOCUMENTS

| | | |
|---|---|---|
| CN | 1462084 A | 12/2003 |
| CN | 2773919 Y | 4/2006 |

(Continued)

*Primary Examiner* — Gary Harris
(74) *Attorney, Agent, or Firm* — Finnegan, Henderson, Farabow, Garrett & Dunner, LLP

(57) ABSTRACT

A battery is provided, comprising: a battery housing having at least one opening end; a battery cover sealing the at least one opening end; an electric core received in the battery housing, which comprises at least one heat-conducting tube having at least an end penetrating through the battery cover; and an electrolyte filled in a space formed by the battery housing with the battery cover.

19 Claims, 19 Drawing Sheets

(51) Int. Cl.
*H01M 10/6551* (2014.01)
*H01M 10/6554* (2014.01)
*H01M 10/613* (2014.01)
H01M 10/6567 (2014.01)
H01M 10/6561 (2014.01)

(56) References Cited

U.S. PATENT DOCUMENTS

2002/0071986 A1* 6/2002 Exnar ............................ 429/94
2009/0023056 A1* 1/2009 Adams ................ B60L 11/1872
429/120
2010/0279159 A1* 11/2010 Meintschel et al. ............ 429/94
2012/0064389 A1* 3/2012 Uh ...................... H01M 2/0217
429/163

FOREIGN PATENT DOCUMENTS

| | | |
|---|---|---|
| CN | 101202330 A | 6/2008 |
| CN | 201570566 U | 9/2010 |
| CN | 201936949 U | 8/2011 |
| CN | 102751466 A | 10/2012 |
| CN | 102569866 B | 5/2014 |
| DE | 102009027178 A1 | 12/2010 |
| EP | 0620610 A1 | 10/1994 |
| WO | WO 2011/009619 A1 | 1/2011 |

* cited by examiner

ELECTRIC VEHICLE BATTERY WITH TEMPERATURE CONTROL

CROSS-REFERENCE TO RELATED APPLICATION

This application claims priority to and benefits of Chinese Patent Application No. 201010622284.X filed with the State Intellectual Property Office of the People's Republic of China (SIPO) on Dec. 31, 2010, and Chinese Patent Application No. 201010621585.0 filed with the State Intellectual Property Office of the People's Republic of China (SIPO) on Apr. 22, 2011, the contents of both of which are incorporated by reference herein in their entirety.

FIELD

The present disclosure relates to the field of energy storage, more particularly to a battery.

BACKGROUND

With the exhaustion of the global energy resources and the growing emphasis of environment protection, electric vehicles (EVs) and hybrid electric vehicles (HEVs) have drawn wide attention due to their advantages such as low exhaust emissions and energy consumption. The power battery is one of the most important parts of EVs/HEVs, which requires high power, long cycle life and excellent environmental tolerance. Therefore, there is a need for a battery having a uniform and controllable inner temperature.

SUMMARY

Provided herein is a battery comprising:
a battery housing having at least one opening end;
a battery cover sealing the at least one opening end;
an electric core received in the battery housing, which comprises at least one heat-conducting tube having at least one end penetrating through the battery cover; and
an electrolyte filled in a space formed by the battery housing with the battery cover.

In some embodiments, the electric core comprises:
an insulating roll core with the at least one heat-conducting tube at least partially received therein;
a positive plate having a positive tab;
a negative plate having a negative tab; and
a separator between the positive plate and the negative plate;
wherein the positive plate, the negative plate and the separator are wound on the insulating roll core, and the at least one heat-conducting tube is thermally connected with at least one of the positive tab and the negative tab.

In some embodiments, the at least one heat-conducting tube may be a hollow tube; in some embodiments, the at least one heat-conducting tube may be a solid tube; its shape may not be limited and can be designed according to the battery core. The material of the at least one heat-conducting tube may also not be limited; for example, it may be made from metals or ceramics. The number of the at least one heat-conducting tube may yet not be limited: in one embodiment, it may include a single tube insulated from both the positive tab and the negative tab; in another embodiments, the at least one heat-conducting tube may include a plurality of branch tubes, for example, a positive tube and a negative tube, which are thermally connected with at least one of the positive tab and the negative tab; in yet another embodiment, the at least one heat-conducting tube may be thermally connected with both the positive and the negative tabs, wherein the at least one heat-conducting tube is made of electrically non-conductive material.

The at least one heat-conducting tube may adjust the inner temperature of the battery core. When the inner temperature of the battery core rises quickly or the battery is in an extreme thermal environment, the at least one heat-conducting tube may transfer the inner heat and cool the battery core, and thus may stop further heat reactions in the electrodes, avoid heat accumulation and enhance battery safety. At the same time, the at least one heat-conducting tube may maintain a consistent optimum temperature for the working battery, thus enhancing the cycle performance of the battery. And when the battery is in an extremely cold environment, the at least one heat-conducting tube may transfer heat and warm up the battery core, and thus may keep the battery working in a uniform optimum temperature. Furthermore, the at least one heat-conducting tube may be set in the battery core as a backbone holding the electric core, and thus may facilitate the assembly and winding, and prevent the battery core from loosening or being destroyed.

In some embodiments, the at least one heat-conducting tube may be thermally connected with the electrode tabs. The electrode tabs are the heat concentration region in the battery; therefore, heat transfer between the at least one heat-conducting tube and the electrode tabs may enhance battery safety and maintain a consistent temperature in the battery.

In some embodiments, the at least one heat-conducting tube may be made of electrically conductive material, and may comprise a positive tube and a negative tube electrically insulated from each other. The positive tube may be electrically connected with the positive tab and insulated from the negative tab; the negative tube may be electrically connected with the negative tab and insulated from the positive tab; and the positive tube and the negative tube may penetrate through the battery cover. The positive tube and the negative tube may be formed as electrical terminals for current lead-out. The battery cover may be electrically insulated from at least one of the positive tube and the negative tube.

In some embodiments, the battery cover may include a first cover hermetically sealing a first open end of the battery housing and a second cover hermetically sealing a second open end of the battery housing. In one embodiment, the positive tube and the negative tube may be hermetically sealed with and penetrate through both the first cover and the second cover. Thus, both the positive tube and the negative tube may extend from the first and second open ends of the battery housing. In another embodiment, both ends of the positive tube may penetrate through the first cover, and both ends of the negative tube may penetrate through the second cover. The positive tube and the negative tube may be U-shaped. Thus, the positive tube may extend from one open end of the battery housing, and the negative tube may extend from another open end of the battery housing.

In some embodiments, the battery may include at least one connector for connecting the at least one heat-conducting tube with the electrode tabs. In some embodiments, the connector may include a first connector for connecting the positive tube with the positive tab and a second connector for connecting the negative tube with the negative tab.

In some embodiments, the positive plate may include a first coating region having positive material coated thereon and a first non-coating region without positive material being coated thereon; the negative plate may include a second coating region having negative material coated thereon and a second non-coating without negative material being coated thereon. The positive tab may be formed by coiling the first non-coating region at a first end of the electric core; and the negative tab may be formed by coiling the second non-coating region at a second end of the electric core.

In some embodiments, the connector may be annular which is fitted over the non-coating region, and may be pressed and connected with the electrode tabs, for example, by welding, adhesion or riveting. In one embodiment, the first connector may be annular which is fitted over the first non-coating region, and the second connector may be annular which is fitted over the second non-coating region. In another embodiment, the connector may include a bending portion connected with the electrode tabs.

In some embodiments, a plurality of electrically connecting elements may be connected between the connector and the at least one heat-conducting tube. In one embodiment, a plurality of first electrically connecting elements may be connected between the first connector and the positive tube, and a plurality of second electrically connecting elements may be connected between the second connector and the negative tube. The connection between the connector and the at least one heat-conducting tube by electrically connecting elements may improve the connecting section to reduce the resistance of the battery and to increase the heat conducting rate.

In some embodiments, an insulating layer may be formed on an external surface of the at least one heat-conducting tube.

In some embodiments, the positive tube, the negative tube and the insulating layer may be integrally formed on the insulating roll core, which is wound with the positive plate, the negative plate and the separator therebetween to form the electric core. In one embodiment, the insulating roll core may be prismatic and located in the center of the electric core as a backbone for holding the electric core, thus facilitating the assembly and winding.

In some embodiments, the positive tube may be made of aluminum and the negative tube may be made of copper.

In some embodiments, the at least one heat-conducting tube may be formed with projections on the external surface thereof for heat dissipation. The projections may increase the surface area of heat conduction.

In some embodiments, there may be a thermally conducting medium flowing in the at least one heat-conducting tube. The thermally conducting medium may be electrically conductive or electrically insulating, for example, electrically insulating silicone-gel. In one embodiment, the thermally conducting medium may be a liquid medium such as water, kerosene, and ethylene glycol; in another embodiment, the thermally conducting medium may be a gas medium such as ambient air or nitrogen.

In some embodiments, the battery may further comprise a cycling unit connected with the at least one heat-conducting tube for driving the thermally conducting medium flowing in the at least one heat-conducting tube. In one embodiment, the cycling unit may include a pump; in another embodiment, the cycling unit may include an air supply duct.

In some embodiments, the battery may further comprise a temperature control unit configured to control the temperature of the thermally conducting medium flowing in the at least one heat-conducting tube.

In some embodiments, the temperature control unit may comprise:

a temperature sensor configured to sample the temperature of the thermally conducting medium;

a cooling unit configured to heat or cool the thermally conducting medium based on a temperature signal received from the temperature sensor; and a control unit configured to control the cooling unit for heating or cooling based on the temperature signal received from the temperature sensor.

Additional aspects and advantages of the embodiments of the present disclosure will be given in part in the following descriptions, become apparent in part from the following descriptions, or be learned from the practice of the embodiments of the present disclosure.

DETAILED DESCRIPTION OF THE EMBODIMENTS

It will be appreciated by those of ordinary skill in the art that the disclosure may be embodied in other specific forms without departing from the spirit or essential character thereof. The presently disclosed embodiments are therefore considered in all respects to be illustrative and not restrictive.

Embodiment 1

As shown in FIG. 1-5, a positive tube 1 and a negative tube 2 are arranged in parallel and then injection molded with an insulating filler 31 to form an insulating roll core 3. The ends of the positive tube 1 and negative tube 2 extend out of the insulating roll core 3. And an insulating layer is formed on an external surface of the positive tube 1 and the negative tube 2.

The positive tube 1 and negative tube 2 can be straight or bending tubes. The positive tube 1 is made of aluminum and the negative tube 2 is made of copper. The thickness of the tubes may range from about 0.1 mm to about 5 mm, such as from about 1 mm to about 3 mm.

Figure 1:
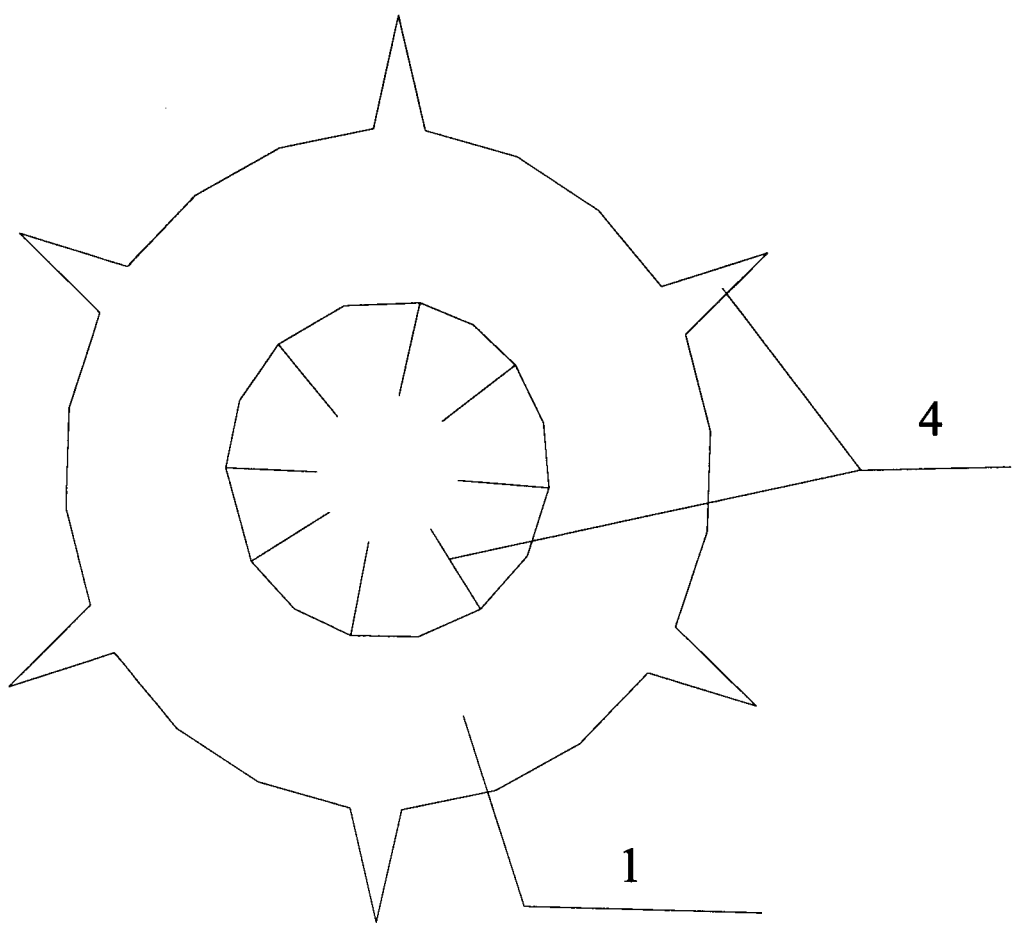
FIG. 1 illustrates a cross-sectional view of at least one heat-conducting tube according to Embodiment 1 of the present disclosure.

As shown in FIG. 1, the heat-conducting tubes 1 and 2 are formed with projections 4 on an external surface and an inner surface thereof for heat dissipation. The projections 4 may have a needle, conical, sheet, or columnar shape.

The insulating filler 31 may be engineering plastics, such as PPS.

Figure 2:
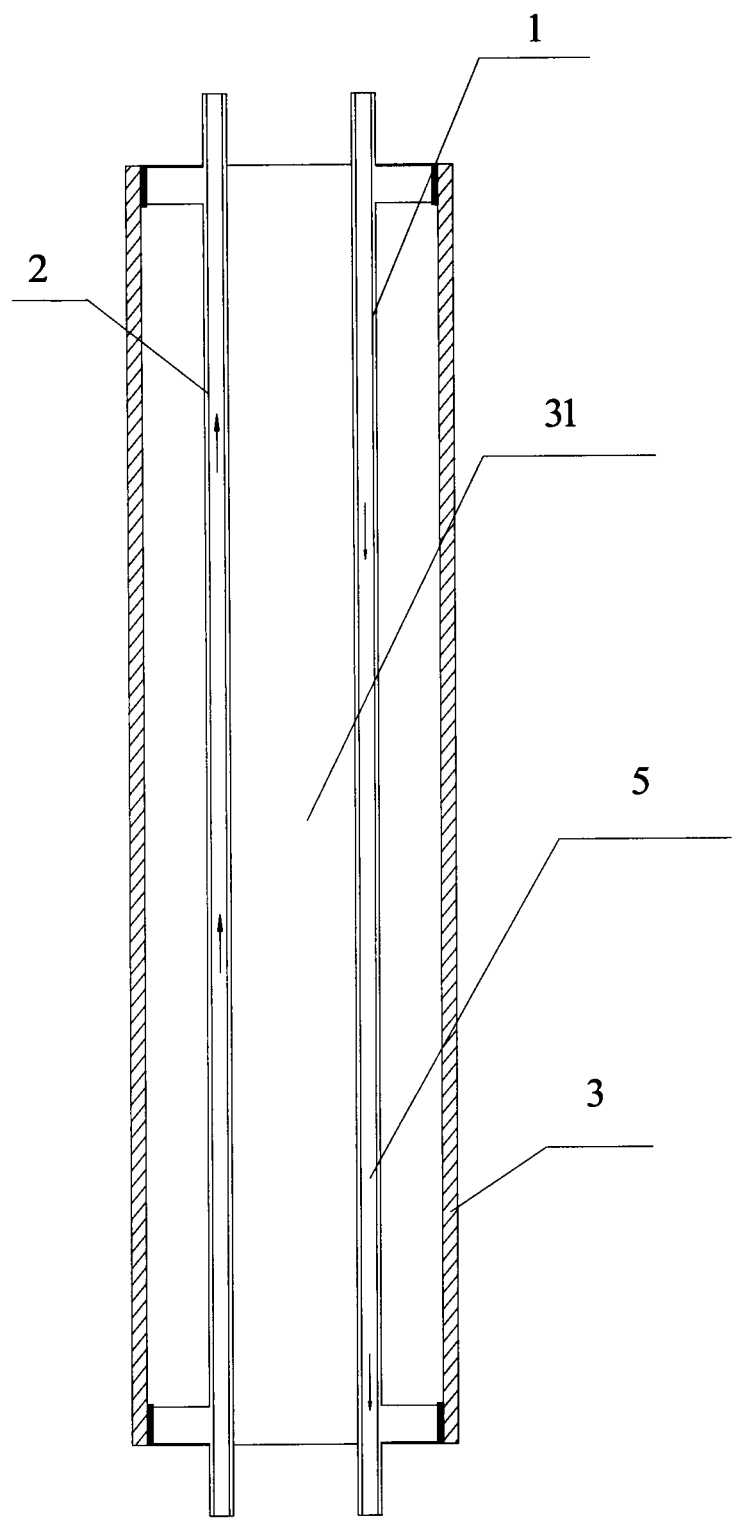
FIG. 2 illustrates a cross-sectional view of an insulating roll core according to Embodiment 1 of the present disclosure.

As shown in FIG. 2, there is a thermally conducting medium 5 flowing in the heat-conducting tubes 1 and 2. As shown by the arrows, the thermally conducting medium 5 flows through the heat-conducting tubes 1 and 2 from one end to the other end thereof, and the flow directions may be different or the same. The thermally conducting medium 5 may be selected from silicone-gel, water, kerosene, ethylene glycol, ambient air, and nitrogen.

Figure 3:
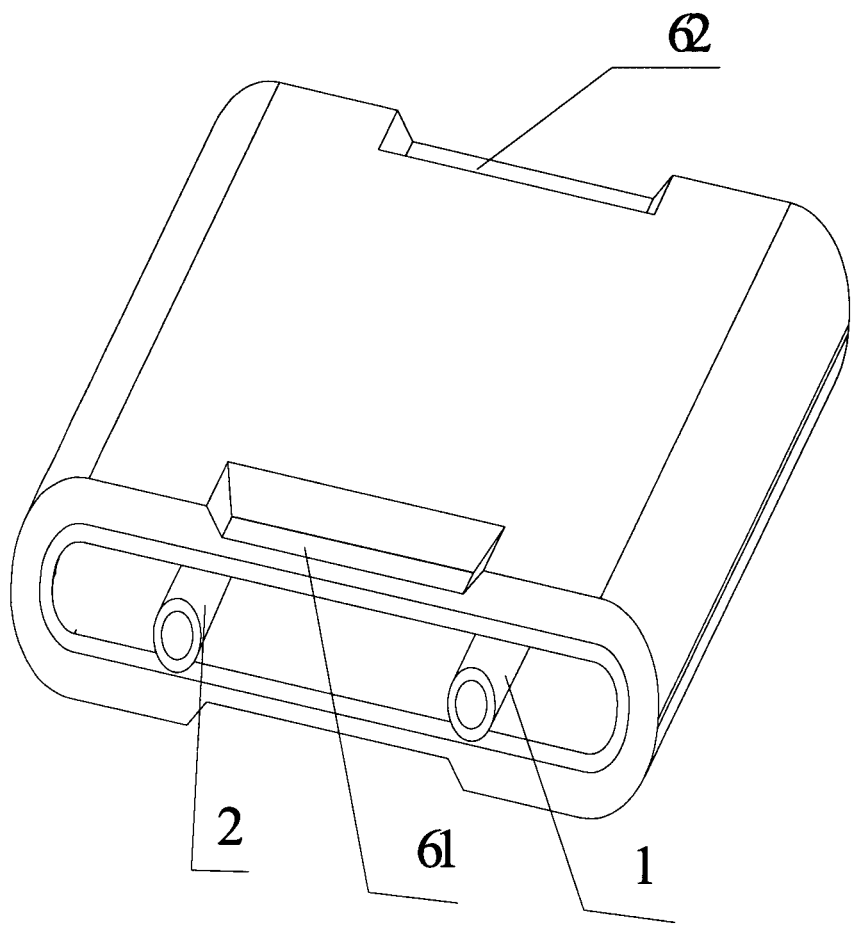
FIG. 3 illustrates the structure of an electric core according to Embodiment 1 of the present disclosure.

The insulating roll core 3 is wound with a positive plate, a negative plate and a separator between the positive plate and the negative plate to form an electric core, as shown in FIG. 3. The positive plate includes a first coating region having positive material coated thereon and a first non-coating region without positive material being coated thereon; the negative plate includes a second coating region having negative material coated thereon and a second non-coating without negative material being coated thereon; a positive tab 61 is formed by coiling the first non-coating region at a first end of the electric core; and a negative tab 62 is formed by coiling the second non-coating region at a second end of the electric core.

Figure 4:
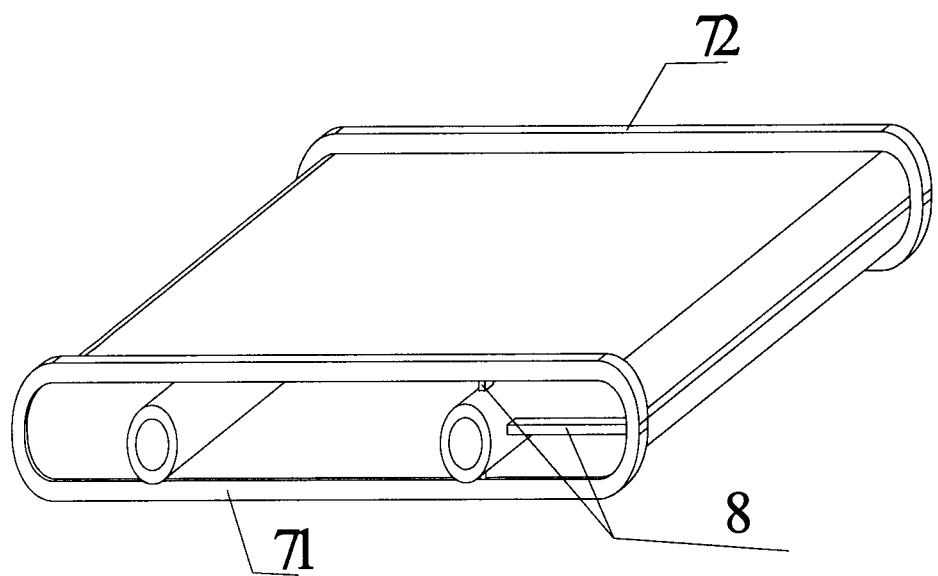
FIG. 4 illustrates the structure of an electric core with a first connector and a second connector according to Embodiment 1 of the present disclosure.

The ends of the positive tube 1 and negative tube 2 extend out of the electric core. As shown in FIG. 4, a first connector 71 is connected with the positive tab 61 by welding; and a second connector 72 is connected with the negative tab 62 by welding. The shape of the connectors 71 and 72 are designed according to the shape of the tabs 61 and 62. The first connector 71 is annular which is fitted over the positive tab 61, and the second connector 72 is annular which is fitted over the negative tab 62. The thickness of the connectors 71, 72 may range from about 1 mm to about 10 mm, such as from about 3 mm to about 5 mm. The first connector 71 and the positive tab 61 are made of aluminum; and the second connector 72 and the negative tab 62 are made of cooper. The cross-section of the first connector 71 may be greater than that of the second connector 72.

As shown in FIG. 4, a plurality of first electrically connecting elements 8 are connected between the first connector 71 and the positive tube 1, and a plurality of second electrically connecting elements are connected between the second connector 72 and the negative tube 2. The electrical connecting elements are made of metals.

Figure 5:
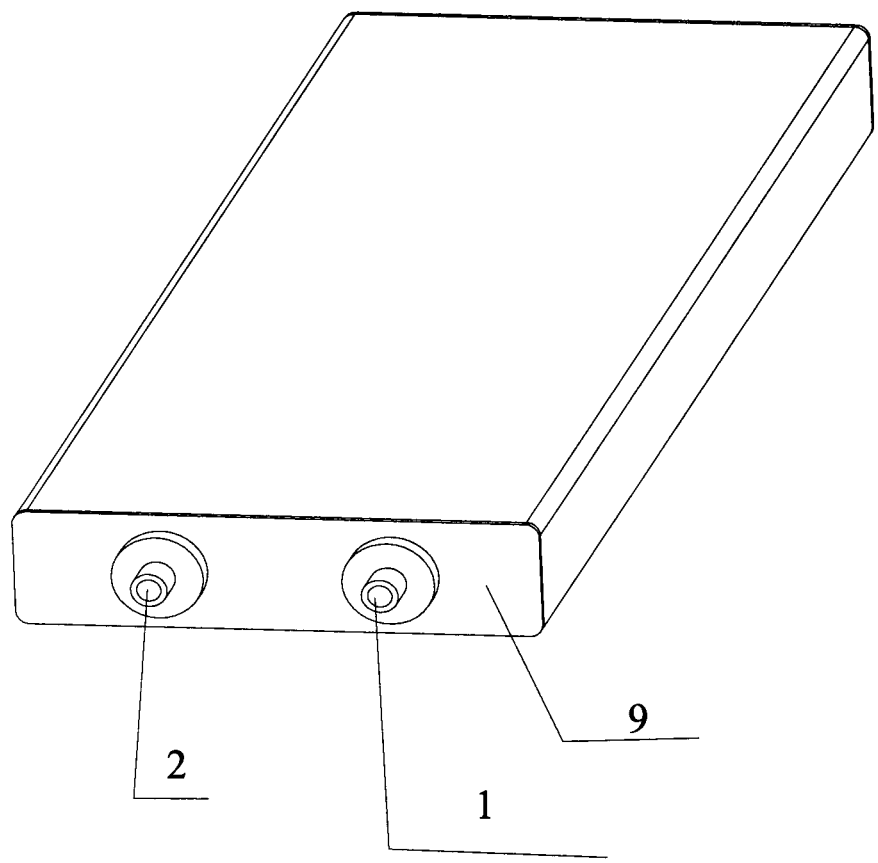
FIG. 5 illustrates the structure of a battery according to Embodiment 1 of the present disclosure.

As shown in FIG. 5, a battery is made by placing the electric core into a battery housing, injecting an electrolyte, sealing and formatting. The positive tube 1 and the negative tube 2 penetrate through and are hermetically sealed with a battery cover 9.

Embodiment 2

As shown in FIG. 6-9, a battery is made substantially similar to that in Embodiment 1 with the exception of using U-shaped tubes as the positive tube 1 and the negative tube 2.

Both ends of the positive tube 1 extend out of one end of the battery; and both ends of the negative tube 2 extend out of the other end of the battery.

Figure 6:
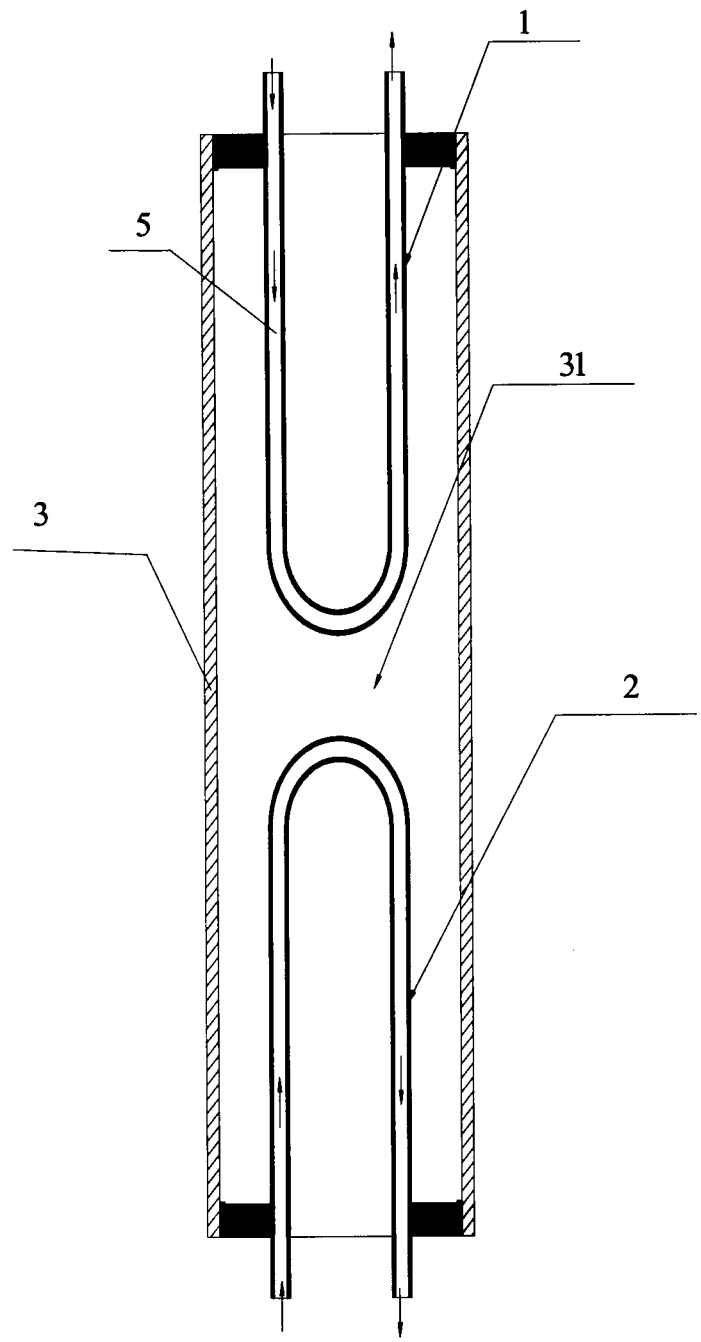
FIG. 6 illustrates a cross-sectional view of an insulating roll core according to Embodiment 2 of the present disclosure.
Figure 7:
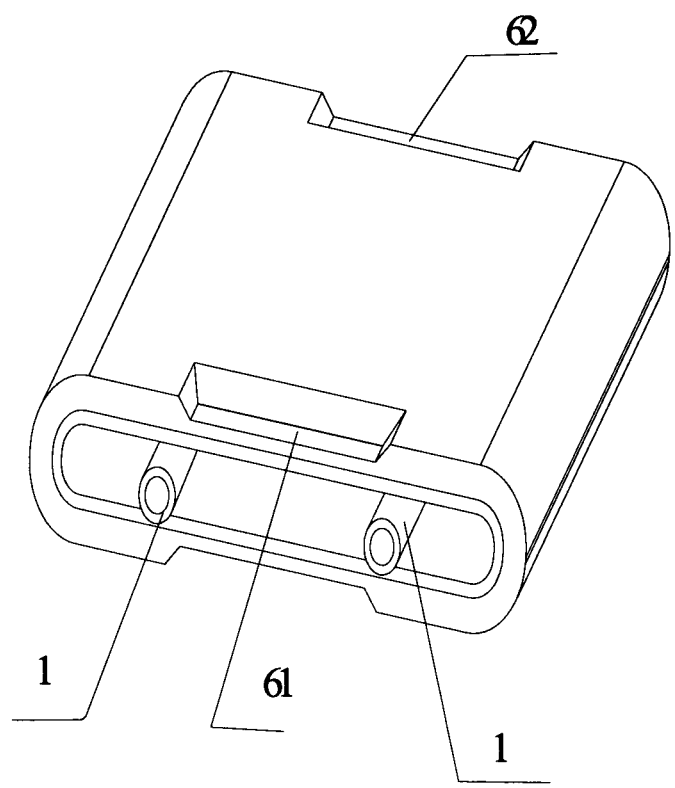
FIG. 7 illustrates the structure of an electric core according to Embodiment 2 of the present disclosure.
Figure 8:
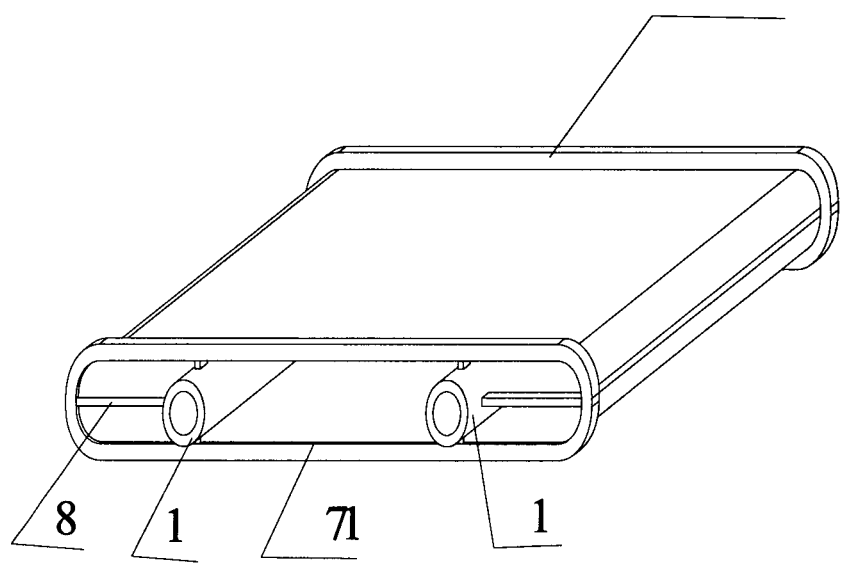
FIG. 8 illustrates the structure of an electric core with a first connector and a second connector according to Embodiment 2 of the present disclosure.

As shown in FIG. 6, in the positive tube 1, the thermally conducting medium 5 flows into the battery from one end of the battery, and flows out of the battery from the same end of the battery; in the negative tube 2, the thermally conducting medium 5 flows into the battery from the other end of the battery, and flows out of the battery from the same end of the battery.

Figure 9:
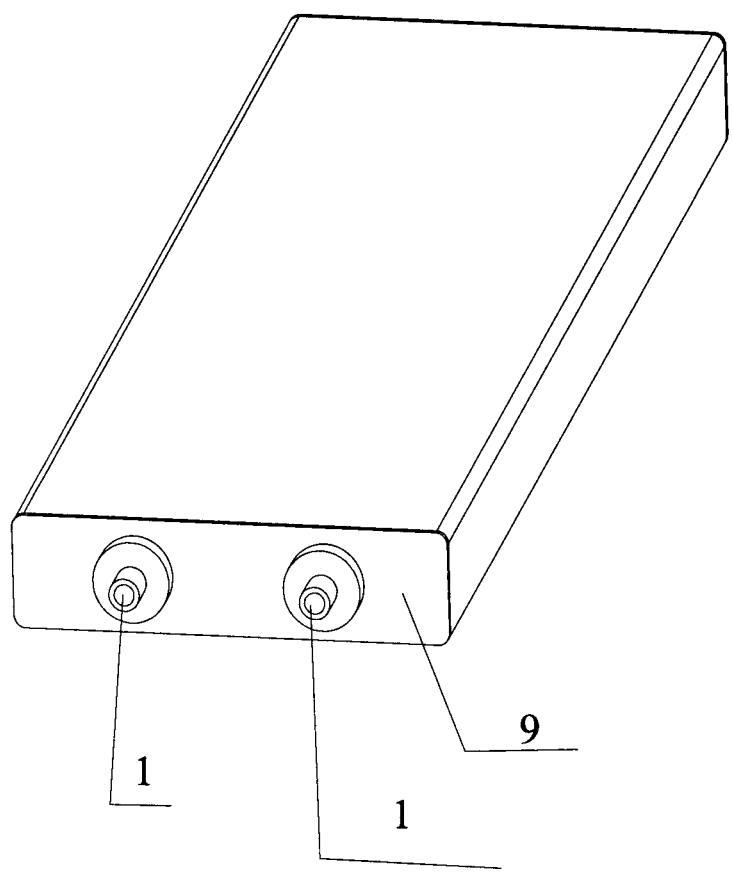
FIG. 9 illustrates the structure diagram of a battery according to Embodiment 2 of the present disclosure.

As shown in FIG. 9, the battery is made by placing the electric core 3 into the battery housing, injecting the electrolyte, sealing and formatting. Both ends of the positive tube 1 penetrate through a first cover 9, and both ends of the negative tube 2 penetrate through a second cover.

Embodiment 3

Figure 10:
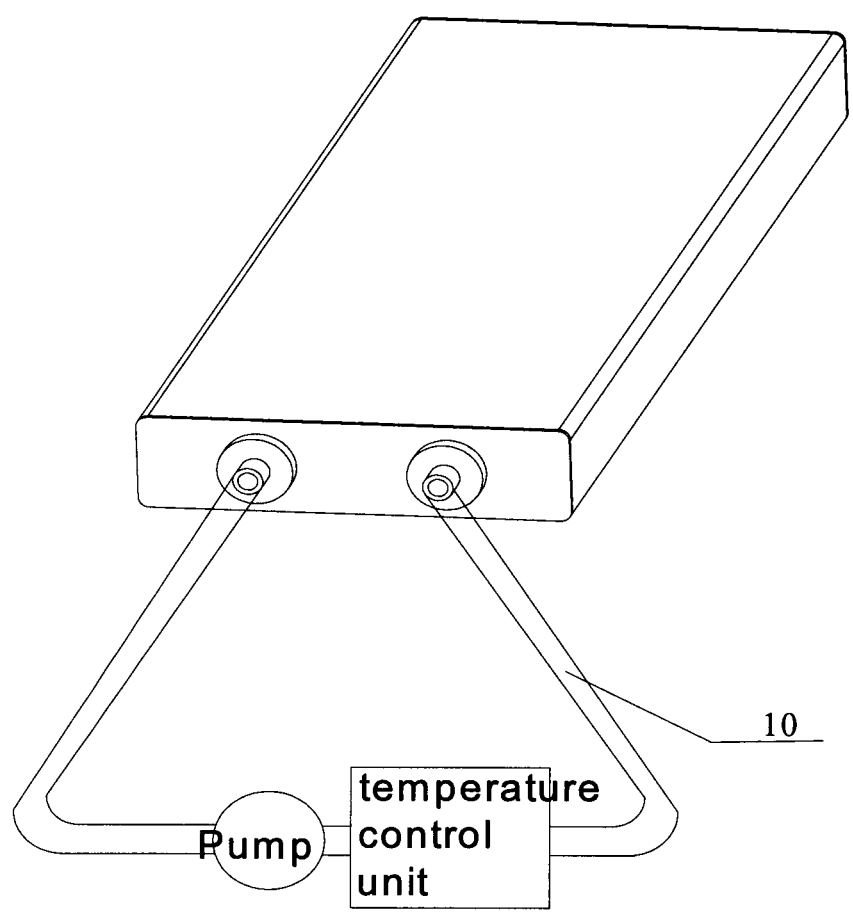
FIG. 10 illustrates the structure of a battery according to Embodiment 3 of the present disclosure.

As shown in FIG. 10, a battery is made substantially similar to that of Embodiment 2 with the exception that the battery further comprises a cycling system 10 connected with the at least one heat-conducting tube for driving the thermally conducting medium 5 flowing in the at least one heat-conducting tube. The cycling unit 10 may be a pump or an air supply duct.

A temperature control unit is configured to control the temperature of the thermally conducting medium 5 flowing in the at least one heat-conducting tube.

The temperature control unit comprises:

a temperature sensor configured to sample the temperature of the thermally conducting medium 5;

a cooling unit configured to heat or cool the thermally conducting medium 5 based on a temperature signal received from the temperature sensor; and a control unit configured to control the cooling unit for heating or cooling based on the temperature signal received from the temperature sensor.

Embodiment 4

As shown in FIG. 11-15, the positive tube 1 and the negative tube 2 are solid tubes which are arranged in parallel and then injection molded with the insulating filler 31 to form the insulating roll core 3. The ends of the positive tube 1 and negative tube 2 extend out of the insulating roll core 3. And the insulating layer is formed on an external surface of the positive tube 1 and the negative tube 2.

The positive tube 1 and the negative tube 2 can be straight or bending tubes. The positive tube 1 is made of aluminum and the negative tube 2 is made of copper. The thickness of the tubes may range from about 0.1 mm to about 5 mm, such as from about 1 mm to about 3 mm.

Figure 11:
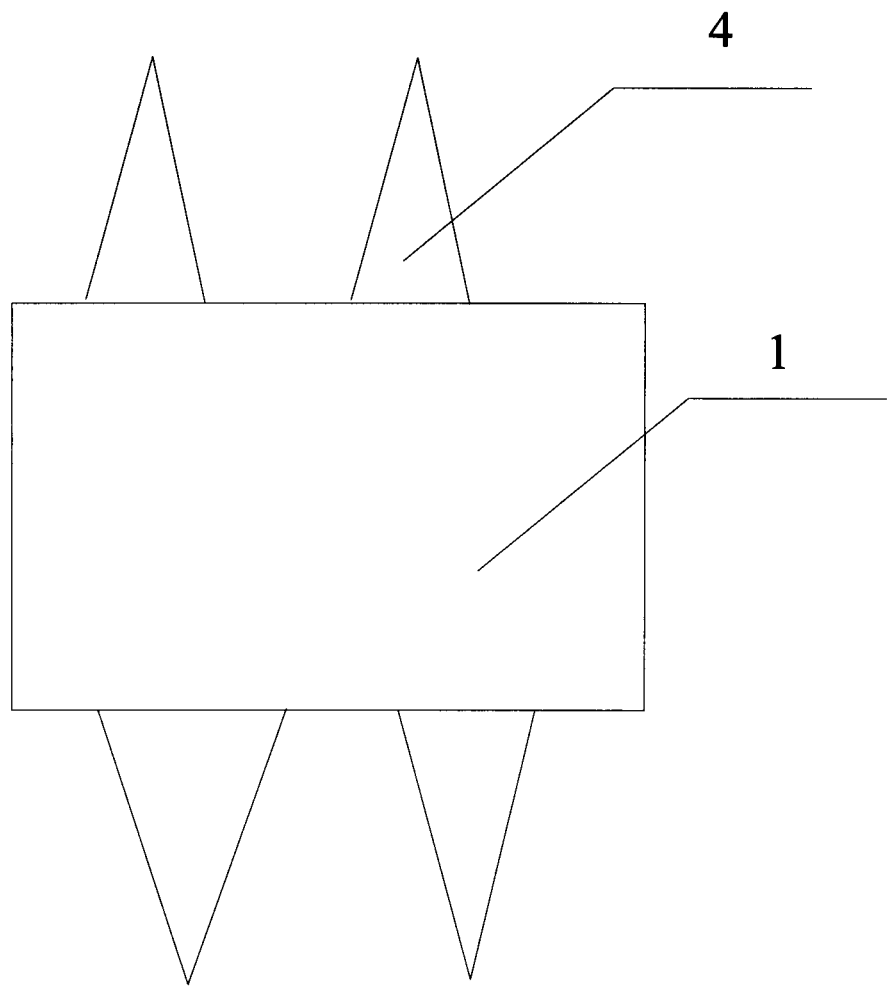
FIG. 11 illustrates a cross-sectional view of at least one heat-conducting tube according to Embodiment 4 of the present disclosure.
Figure 12:
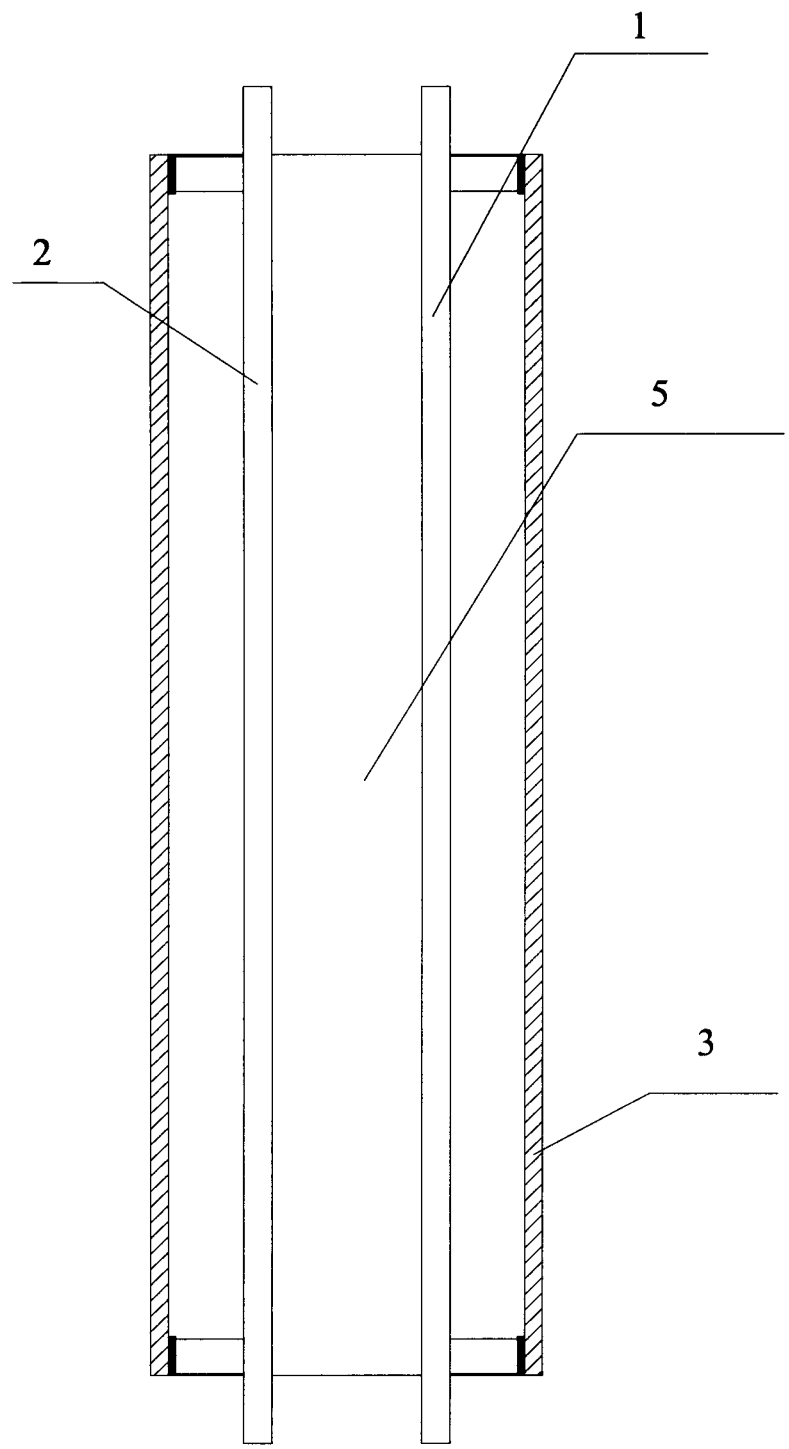
FIG. 12 illustrates a cross-sectional view of an insulating roll core according to Embodiment 4 of the present disclosure.

As shown in FIG. 11, the heat-conducting tubes 1 and 2 are formed with projections 4 on an external surface and an inner surface thereof for heat dissipation. The projections 4 may have a needle, conical, sheet, or columnar shape.

The insulating filler 31 may be engineering plastics, such as PPS.

Figure 13:
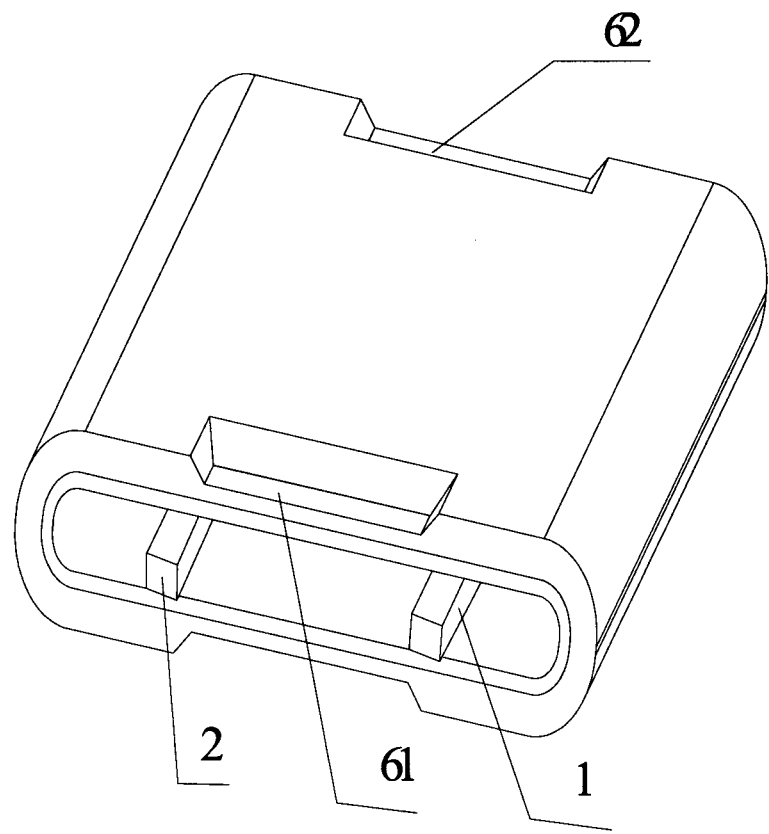
FIG. 13 illustrates the structure of an electric core according to Embodiment 4 of the present disclosure.

The insulating roll core 3 is wound with the positive plate, the negative plate and the separator between the positive plate and the negative plate to form the electric core, as shown in FIG. 13. The positive plate includes a first coating region having positive material coated thereon and a first non-coating region without positive material being coated thereon; the negative plate includes a second coating region having negative material coated thereon and a second non-coating without negative material being coated thereon; the positive tab 61 is formed by coiling the first non-coating region at the first end of the electric core; and the negative tab 62 is formed by coiling the second non-coating region at the second end of the electric core.

Figure 14:
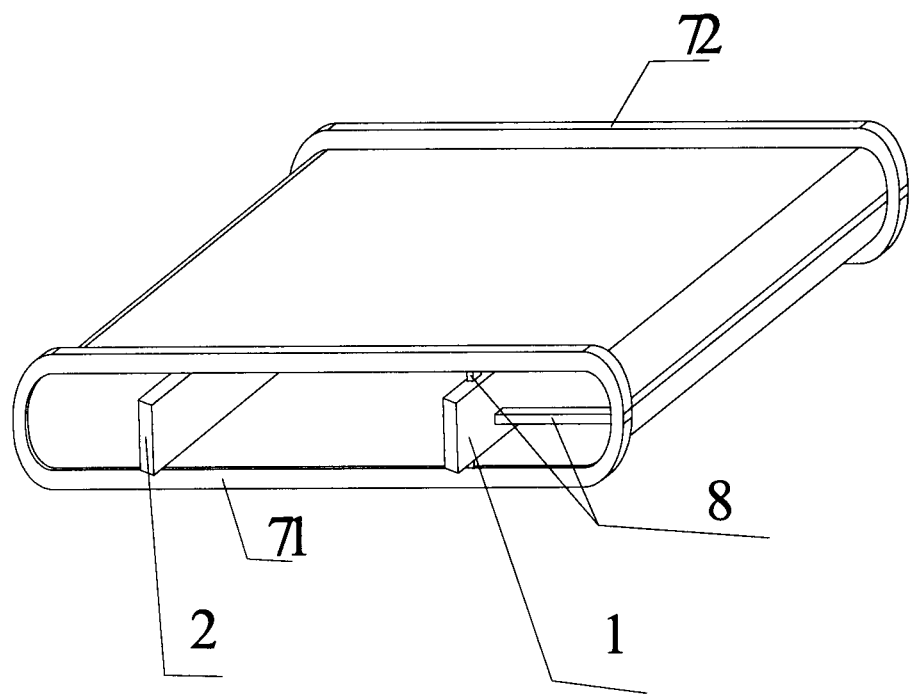
FIG. 14 illustrates the structure diagram of an electric core with a first connector and a second connector according to Embodiment 4 of the present disclosure.

The ends of the positive tube 1 and negative tube 2 extend out of the electric core. As shown in FIG. 14, the first connector 71 is connected with the positive tab 61 by welding; and the second connector 72 is connected with the negative tab 62 by welding. The shape of the connectors 71 and 72 are designed according to the shape of the tabs 61 and 62. The first connector 71 is annular which is fitted over the positive tab 61, and the second connector 72 is annular which is fitted over the negative tab 62. The thickness of the connectors 71, 72 may range from about 1 mm to about 10 mm, such as from about 3 mm to about 5 mm. The first connector 71 and the positive tab 61 are made of aluminum; the second connector 72 and the negative tab 62 are made of cooper. The cross-section of the first connector 71 is greater than that of the second connector 72.

As shown in FIG. 14, a plurality of first electrical connecting elements 8 are connected between the first connector 71 and the positive tube 1, and a plurality of second electrical connecting elements are connected between the second connector 72 and the negative tube 2. The electrical connecting elements are made of metals.

Figure 15:
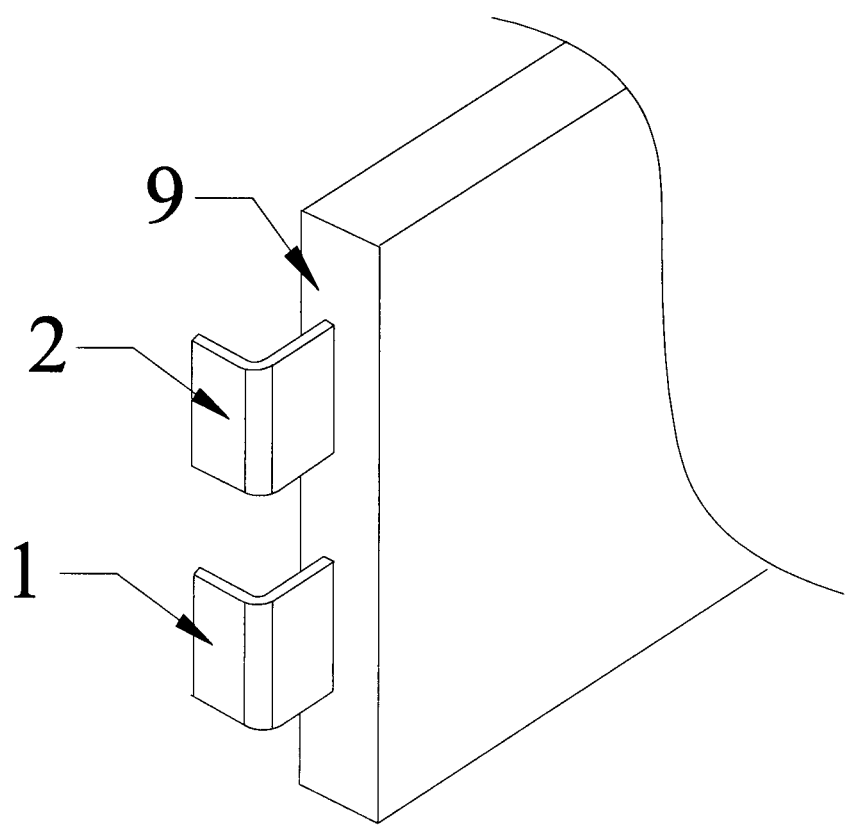
FIG. 15 illustrates a partial structure of a battery according to Embodiment 4 of the present disclosure.
Figure 16:
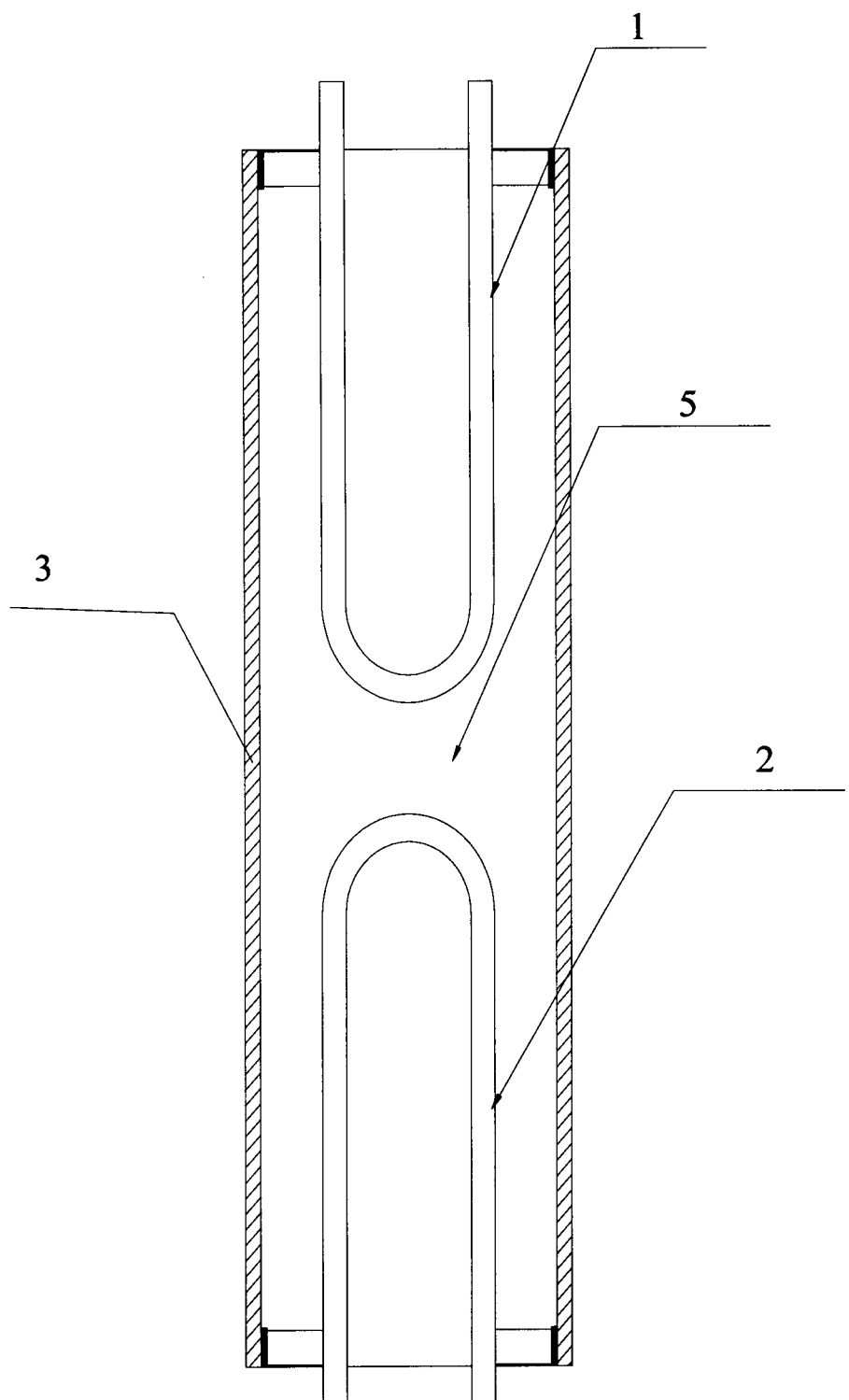
FIG. 16 illustrates a cross-sectional view of an insulating roll core according to Embodiment 5 of the present disclosure.
Figure 17:
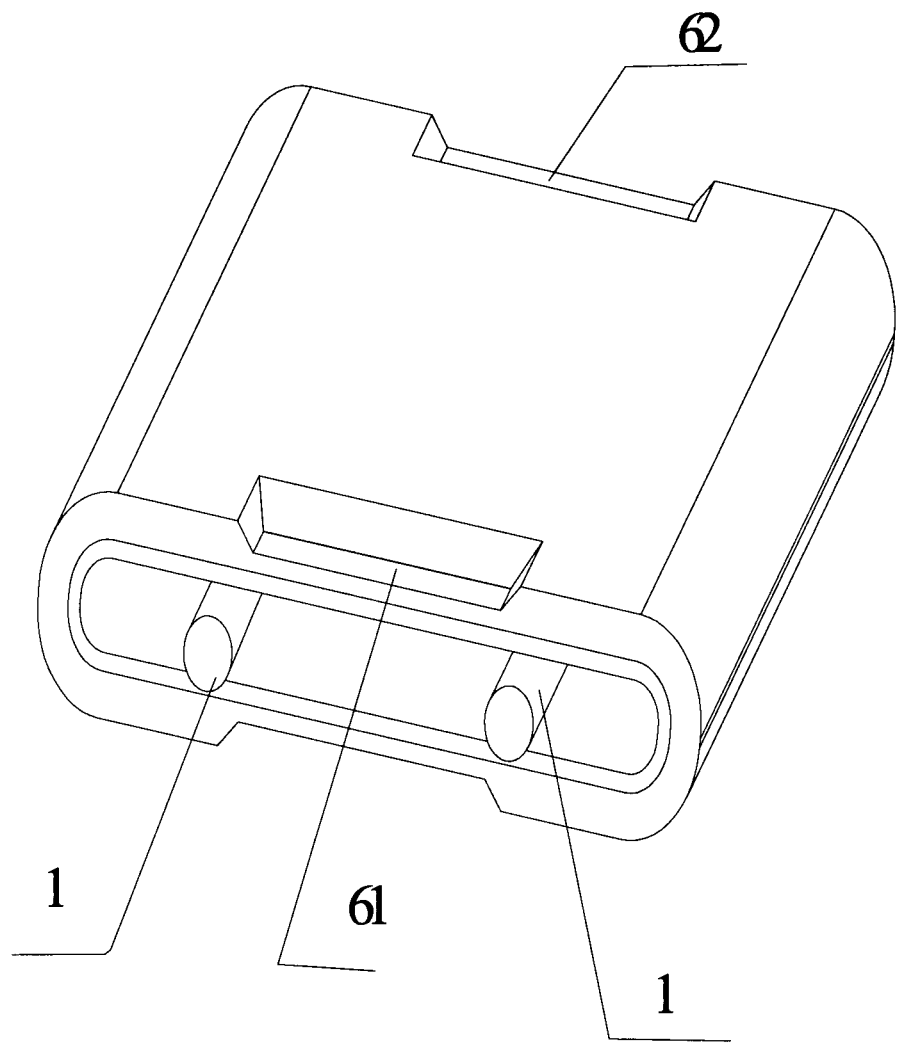
FIG. 17 illustrates the structure of an electric core according to Embodiment 5 of the present disclosure.
Figure 18:
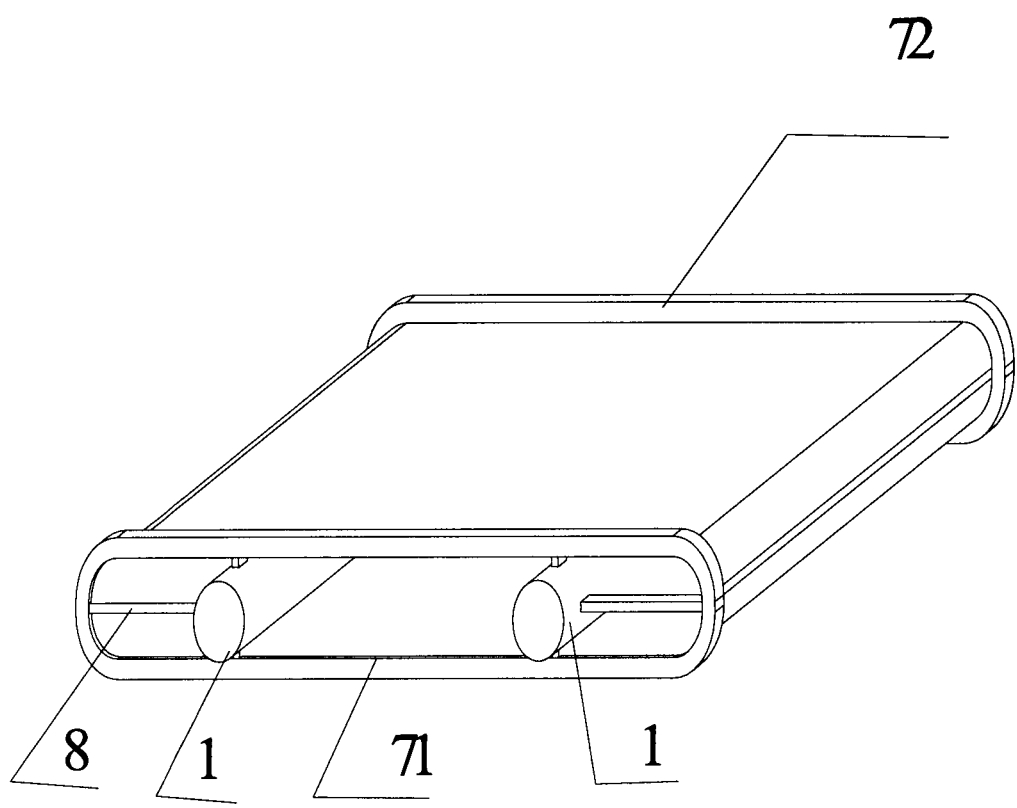
FIG. 18 illustrates the structure of an electric core with a first connector and a second connector according to Embodiment 5 of the present disclosure.

As shown in FIG. 15, the battery is made by placing the electric core into the battery housing, injecting the electrolyte, sealing and formatting. The positive tube 1 and the negative tube 2 penetrate through and are hermetically sealed with the battery cover 9.

Embodiment 5

As shown in FIG. 16-19, a battery is made substantially similar to that of Embodiment 4 with the exception of using U-shaped solid tubes as the positive tube 1 and the negative tube 2.

Both ends of the positive tube 1 extend out of one end of the battery; and both ends of the negative tube 2 extend out of the other end of the battery.

Figure 19:
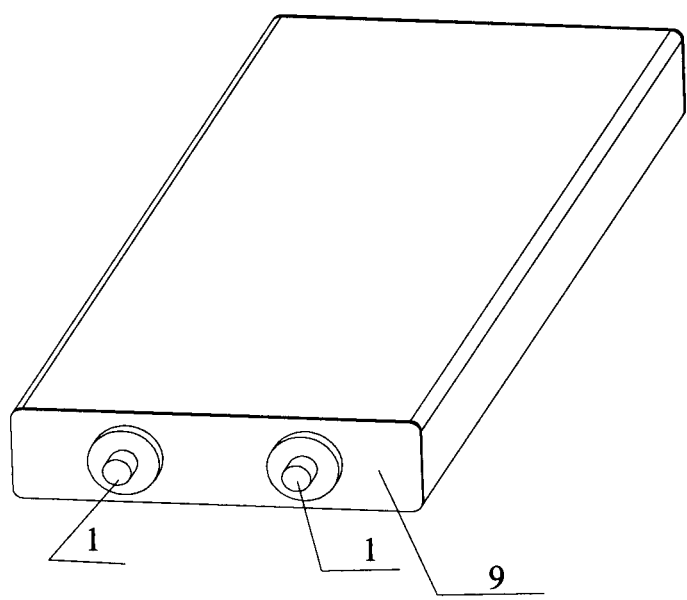
FIG. 19 illustrates the structure of a battery according to Embodiment 5 of the present disclosure.

As shown in FIG. 19, the battery is made by placing the electric core into the battery housing, injecting the electrolyte, sealing and formatting. Both ends of the positive tube 1 penetrate through the first cover 9, and both ends of the negative tube 2 penetrate through the second cover.

Although explanatory embodiments have been shown and described, it would be appreciated by those skilled in the art that changes, alternatives, and modifications can be made in the embodiments without departing from spirit and principles of the invention. Such changes, alternatives, and modifications all fall into the scope of the claims and their equivalents.

What is claimed is:

1. A battery, comprising:
   a battery housing having at least an opening end;
   a battery cover sealing the opening end;
   an electric core received in the battery housing, which comprises an insulating roll core, at least one heat-conducting tube, a positive plate having a positive tab, a negative plate having a negative tab, and a separator between the positive plate and the negative plate, wherein the insulating roll core is filled with an insulating filler and the at least one heat-conducting tube at least partially penetrates through the insulating roll core;
   an electrolyte filled in a space formed between the battery housing with the battery cover and the electric core,
   wherein the at least one heat-conducting tube comprises a positive tube and a negative tube having at least an end penetrating through the battery cover;
   a first connector configured to connect the positive tube with the positive tab; and
   a second connector configured to connect the negative tube with the negative tab.

2. The battery of claim 1, wherein the insulating filler is made of engineering plastics.

3. The battery of claim 1, wherein the positive plate, the negative plate, and the separator are wound on the insulating roll core, and the at least one heat-conducting tube is thermally connected with at least one of the positive tab and the negative tab.

4. The battery of claim 3, wherein
   the positive tube is electrically connected with the positive tab and insulated from the negative tab; and
   the negative tube is electrically connected with the negative tab and insulated from the positive tab.

5. The battery of claim 4, wherein the battery cover includes a first cover hermetically sealing a first end of the battery housing and a second cover hermetically sealing a second end of the battery housing,
   wherein the positive tube and the negative tube penetrate through the first cover and second cover respectively which are hermetically sealed with the positive tube and the negative tube respectively.

6. The battery of claim 4, wherein the battery cover includes a first cover hermetically sealing a first end of the battery housing and a second cover hermetically sealing a second end of the battery housing; and
   both ends of the positive tube penetrate through the first cover, and both ends of the negative tube penetrate through the second cover respectively.

7. The battery of claim 1, wherein
   the positive plate includes a first coating region having positive material coated thereon and a first non-coating region without positive material being coated thereon;
   the negative plate includes a second coating region having negative material coated thereon and a second non-coating without negative material being coated thereon;
   the positive tab is formed by the coiled first non-coating region at the first end of the electric core; and
   the negative tab is formed by the coiled second non-coating region at the second end of the electric core.

8. The battery of claim 7, wherein the first connector is annular which is fitted over the first non-coating region, and the second connector is annular which is fitted over the second non-coating region.

9. The battery of claim 4, wherein an insulating layer is formed on an external surface of the at least one heat-conducting tube.

10. The battery of claim 9, wherein the positive tube, the negative tube, and the insulating layer are integrally formed on the insulating roll core.

11. The battery of claim 1, wherein the at least one heat-conducting tube is formed with a plurality of projections on an external surface thereof for heat dissipation.

12. The battery of claim 11, wherein the shape of each of the plurality of projections can be selected from one of a needle, conical, sheet, and columnar shape.

13. The battery of claim 1, wherein the insulating filler is electrical insulating and thermal conductive.

14. The battery of claim 1, wherein there is thermal conducting medium flowing in the at least one heat-conducting tube.

15. The battery of claim 14, further comprising a cycling unit connected with the at least one heat-conducting tube for driving the thermal conducting medium flowing in the at least one heat-conducting tube.

16. The battery of claim 15, further comprising a temperature control unit configured to control the temperature of the thermal conducting medium flowing in the at least one heat-conducting tube.

17. The battery of claim 16, wherein the temperature control unit comprises:
    a temperature sensor configured to sample the temperature of the thermal conducting medium;
    a cooling means configured to heat or cool the thermal conducting medium based on a temperature signal received from the temperature sensor; and
    a control unit configured to control the cooling means for heating or cooling based on the temperature signal received from the temperature sensor.

18. The battery of claim 1, wherein the at least one heat-conducting tube is a hollowed one.

19. The battery of claim 1, wherein the at least one heat-conducting tube is a solid one.

* * * * *